United States Patent [19]

Fang

[11] Patent Number: 4,914,177

[45] Date of Patent: Apr. 3, 1990

[54] POLYQUINOXALINE POLYMERS, AND ARTICLES COMPRISING SAME

[75] Inventor: Treliant Fang, Lawrenceville, N.J.

[73] Assignee: American Telephone and Telegraph Company, New York, N.Y.

[21] Appl. No.: 72,326

[22] Filed: Jul. 13, 1987

[51] Int. Cl.⁴ .............................................. C08G 12/00
[52] U.S. Cl. .................................. 528/229; 528/227; 528/228; 528/245; 528/266
[58] Field of Search ............... 528/229, 227, 228, 245, 528/266

[56] References Cited

U.S. PATENT DOCUMENTS 3,734,818  5/1973  Augl et al. .......................... 528/229
3,766,141  8/1973  Stille .................................. 528/229

Primary Examiner—John Kight
Assistant Examiner—M. L. Moore
Attorney, Agent, or Firm—Walter G. Nilsen

[57] ABSTRACT

A polyquinoxaline polymer is prepared by self condensation of a monomer having both a 1,2-diketone and a 1,2-primary diamine in the molecule. The resultant polymers can be used as dielectric films, adhesions, varnishes and membranes.

13 Claims, 1 Drawing Sheet

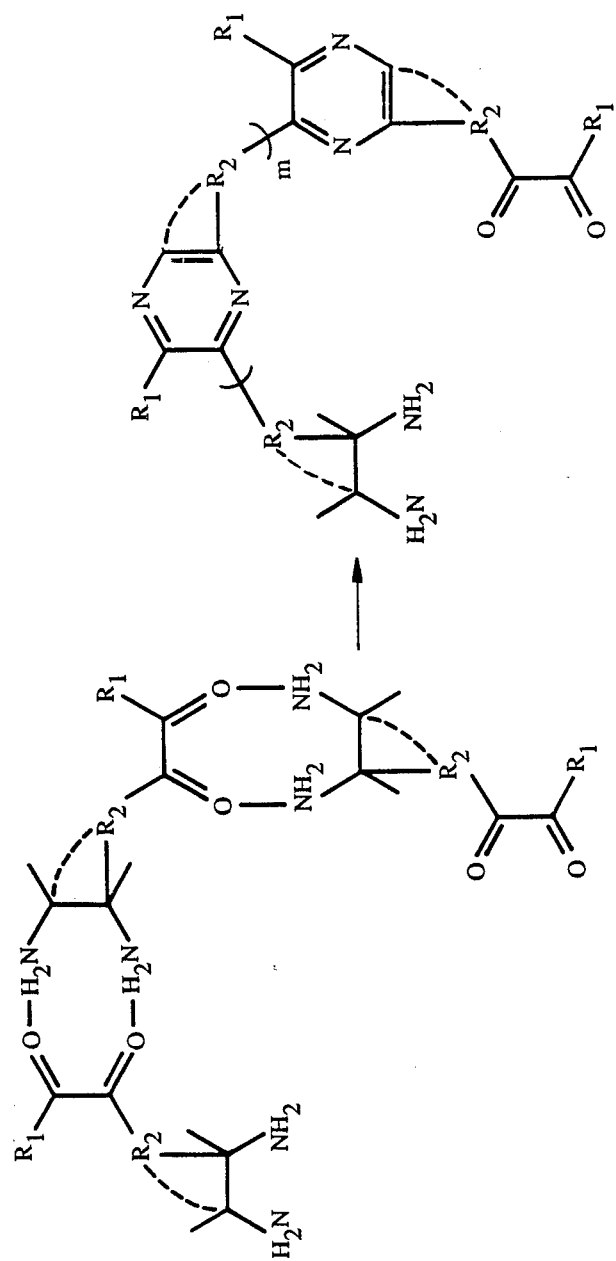

POLYQUINOXALINE POLYMERS, AND ARTICLES COMPRISING SAME

FIELD OF THE INVENTION

This invention relates to new polyquinoxaline polymers, a method of making such polymers and articles of manufacture employing the polymer.

PRIOR ART

Polyquinoxaline polymers have been shown to be thermally stable and to possess good chemical and oil resistant properties as well as a low dielectric constant. They have been used as adhesives in the airplane industry, varnishes for metal coating and enameling, heat-resistant membranes for reverse osmosis and electro-chemical cells and dielectric films in the electronics industry. Their relatively low dielectric constant make them particularly suitable for high-speed circuitry wherein the interconnections and dielectrics employed often impose a limiting time-delay factor for the speed of the circuitry. One commercially available polyquinoxaline is a polyphenylquinoxaline. The synthesis of the prior art type polyphenylquinoxalines have been discussed in articles by L. Fengcai et at, Polymer Science Technology, 26, 261-272 (1984) and K. Ishizu et al, Journal of Polymer Science: Polymer Chemistry Edition, 20, 2851-2862, (1982) which articles are incorporated herein by reference. Polyphenylquinoxalines of the type set forth in those articles are commercially available under the trade name IP 200PPQ from Cemota Company, Vernaison, France. These conventional polyphenylquinoxalines, however, are subject to several drawbacks in their syntheses. One drawback is the fact that the starting material, 3,3'-diaminobenzidine is carcinogenic. Another drawback in the synthesis of the prior art polyphenylquinoxalines is the sensitivity of the polymer viscosity to the stoichiometric ratio of the starting materials. I have overcome these difficulties by preparing a new form of polyquinoxalines using starting materials which are not known carcinogens and which are self-polymerizing making the synthesis independent of stoichiometric ratios.

BRIEF DESCRIPTION OF THE DRAWING

FIG. 1 is a representation of the polymerization process forming the novel polymers.

SUMMARY OF THE INVENTION

A polyquinoxaline has been prepared wherein the repetitive polymer groups have the general structural formula

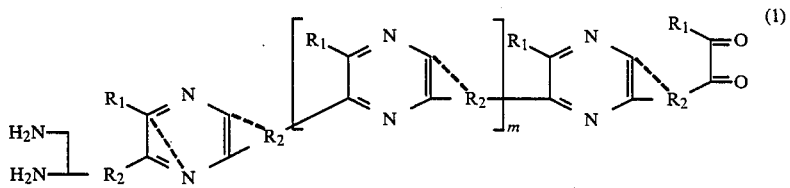
(1)

The novel form of the polyquinoxaline is prepared by self-polymerization of a monomer containing a 1,2-diketone and a 1,2-diamine.

The invention further includes articles of manufacture comprising a substrate having a layer of a novel polyquinoxaline thereover as well as films of the polymer. The layer of polyquinoxaline may be used as an adhesive so as to form a laminate between the substrate and a second member or it may be used, for example as a varnish over a metal substrate or as a dielectric film in an electronic device. Further, a free-standing film may be formed for use as a membrane.

DETAILED DESCRIPTION

A new polyquinoxaline polymer has been synthesized. This polymer may be made from starting materials which have not been reported to be carcinogenic. Also, a new polymerization technique, which I have termed reductive polymerization may be employed to form the polymer. Generally, the novel polyquinoxalines are prepared by polymerization wherein a 1,2-diketone, which may be represented by the formula

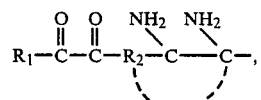

is self-polymerized by the condensation reaction between a 1,2 primary diamine assocaited with either or both of the $R_1$ or $R_2$ groups of one molecule with the oxygen atoms of the diketone groups from another molecule. Either $R_1$, or

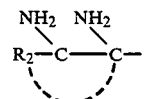

or both are selected from an aromatic, cyclic or aliphatic group containing the reactive 1,2-diamine. If $R_1$ does not contain such a diamine then it may be any aliphatic, cyclic or aromatic constituent or hydrogen. For example, $R_1$ it may be H, a $C_1$ to $C_{30}$ saturated or unsaturated alkyl chain, phenyl, phenyl sulfone, naphthyl, anthracyl, phenoxy or cyclopentyl group. Similarly

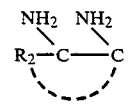

may be a $C_1$ to $C_{30}$ saturated or unsaturated alkyl group or a saturated, partially saturated or unsaturated cyclic moiety. The dotted line in the structural formulas between $R_2$ and the distal amine carbon is meant to show those instances where a cyclic member is present. Of course, the properties of the polyquinoxaline polymer formed by this polymerization depends not only upon the specific conditions of polymerization which can determine the length of the primary chain and degree of cross linking, if any, but the particular nature of the $R_1$ and $R_2$ groups.

FIG. 1 depicts the condensation polymerization process from a monomer represented by the formula

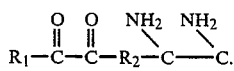

As can be seen, one molecule of the monomer aligns such that the oxygen atoms of the diketone in that molecule are in proximity with and reacts and condenses with the amine groups of an adjacent monomer molecule so as to give off water and form a polymeric unit having a 1,4 diazine in its backbone. As shown in the Figure, the repetitive polymeric unit may be represented by the formula

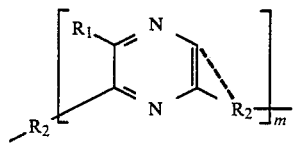 (2)

wherein m depends upon the desired polymer properties but is typically in the range from 10 to 1000 for most uses but may be more or less.

Examples of what I believe are preferred monomers useful in the preparation of polyquinoxalines are as follows:

(3)

I

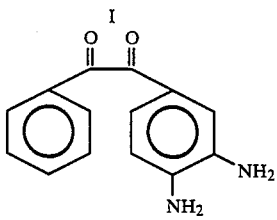

II

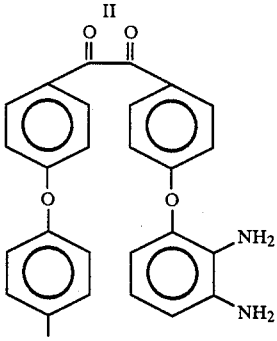

III

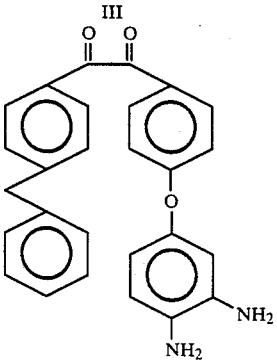

-continued

V

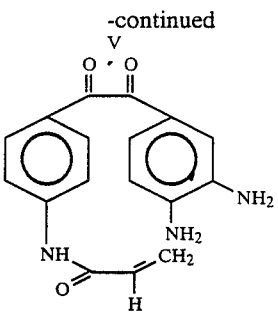

VI

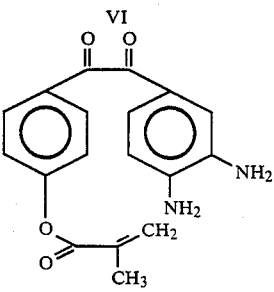

VII

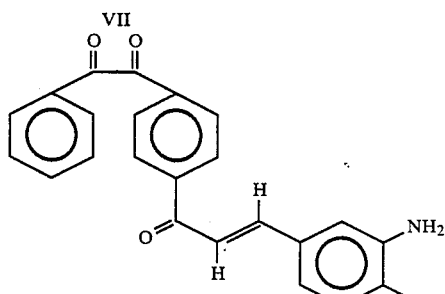

IV

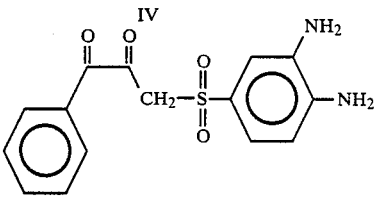

Monomers V–VII include photosensitive groups in the molecule, e.g. the acrylamide, the methacrylate and the vinyl ketone groups, respectively. The addition of such groups will allow for crosslinking by photopolymerization.

The monomer can be stabilized and polymerization controlled by preparing a precursor to the monomer which, when treated with an activating material, (deprotection) forms the monomer. For example, if one forms a monomer wherein one of the amine groups is modified or protected, e.g. the monomer shown below wherein one of the primary amines has been modified to convert the amine to a secondary amine, the condensation reaction for polymerization with the diketone will not occur.

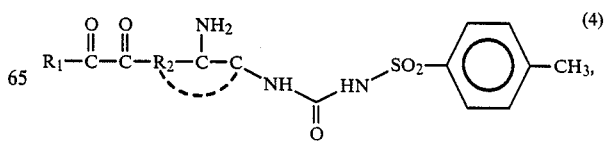 (4)

However, by adding ethanol in a cresol solution, the 1,2 primary diamine will form and self-polymerize. Stabilization of this type is generally known in the art and many other stabilizing-destabilizing combinations will become obvious to those skilled in the art. Another means of stabilizing the monomer is by what I term reductive polymerization of the monomer precursor. More particularly, a monomer precursor, e.g.

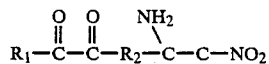

is reduced such as by treating the precursor with iron filings in an acetic acid solution to reduce the $NO_2$ group and form the active diamine monomer which then undergoes auto polymerization to a polyquinoxaline polymer. The technique should not be limited to the formation of polyquinoxaline polymers but may be generally useful for controlling polymerization reactions where a reduced species is necessary for the reaction to proceed. For example, by reducing nitroacetaldehyde by iron powder and a weak acid (or a catalytic hydrogenation) one can form aminoacetaldehyde which then self polymerizes to form $(CH_2-N=CH)_n$ polymeric units. This reaction is shown below:

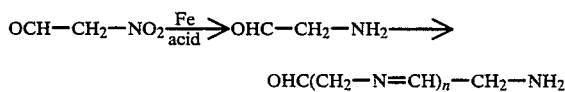

Since polyphenylquinoxalines is a common commercial polyquinoxaline, for comparative purposes, the detailed examples shall related to such polyquinoxalines. However, it should be understood that based upon the teachings herein, those skilled in the art can form polyquinoxalines other than polyphenylquinoxalines using the same general methods of syntheses as described herein.

A phenylquinoxaline represented by the structural formula

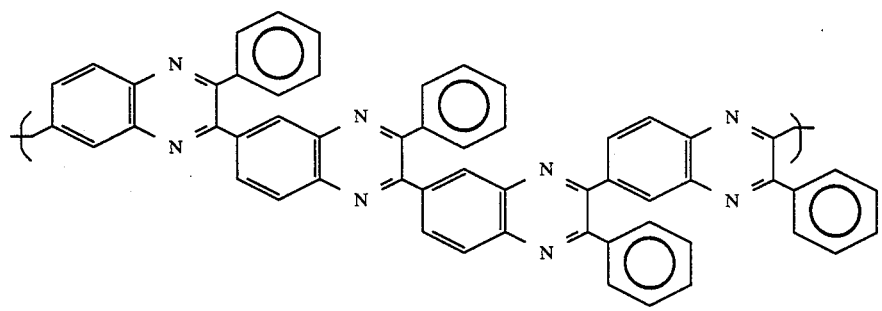

is prepared by self polymerization of a new monomer, namely, 3,4-diaminobenzil. This monomer which has the structural formula

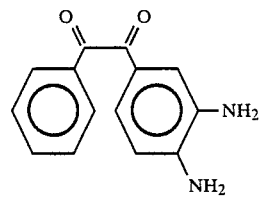

(7)

contains a 1,2-diketone group as well as an o-phenylenediamine unit. The monomer may be prepared in accordance with the follow scheme.

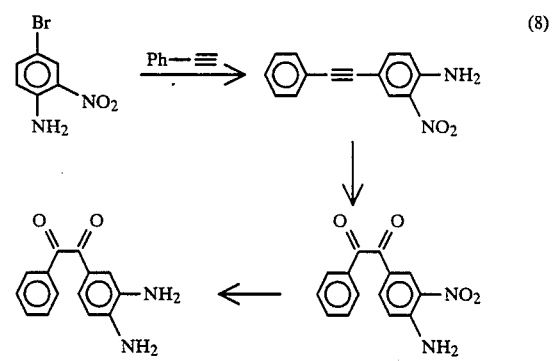

(8)

Here, the coupling reaction of 4-bromo-2-nitroaniline and phenylacetylene catalyst by triphenylphosphine and palladium acetate in the presence of cuprous iodide yields 2-nitro-4-(phenylethynl)aniline. Phase-transfer oxidation using adogen 464 and potassium permangnate in sodium bicarbonate buffered aqueous dichloromethane results in 4-amino-3-nitrobenzil. This compound may then be reduced, e.g. by sodium dithionite to yield the monomer, 3,4-diominobenzil. The monomer is not stable at room temperature and high concentrations and self polymerizes to polyphenylquinoxaline. Using NMR spectroscopy the monomer exhibits a doublet at 6.71 ppm and multiplets at 7.38, 7.54 and 8.00 ppm when freshly prepared in deuteriochloroform. The polymer (6)

peaks gradually appear and grow at 7.43, 7.62, 7.95, 8.10 and 8.50 ppm. After aging for about 24 hours at room temperature all monomer peaks disappear. The glass transition temperature of the resultant polymer, was found to be 290° C. The polymer is capable of being formed into a film by conventional techniques such as spin coating.

It should be understood that the polymer may be modified by employing derivatives of 3,4-diaminobenzil. Due to the instability of the 3,4-diaminobenzil, it is desirable to use a stable precursor which may then be converted to the monomer to induce self polymerization. I have discovered a process I term "reductive polymerization" wherein by reducing the more stable precursor in a controlled fashion, one can control the polymerization reaction of the monomer. I have found that for the polymerization of 3,4-diaminobenzil a suitable precursor is the 4-amino-3-nitrobenzil and a preferred method of reduction was found to be the use of iron filings and acetic acid. The reduction reaction is carried out in m-cresol which is a polymer solvent to prevent premature precipitation of the polyphenylquinoxaline maligima during polymerization. Gel permeation chromotography of the resultant polymer prepared by this reductive polymerization shows a number-average molecular weight of about 23,000 and a weight-average molecular weight of about 61,000. These are much higher than the polymer obtained from the polymerization of impure 3,4-diaminobenzil by a thermal condensation in m-cresol. Another suggested method of reduction is the catalytic hydrogenation of the precursor which should avoid iron contamination in the polymer.

One should note that there is a distinct structural difference between the convention polyphenylquinoxalines of the prior art and the polyphenylquinoxaline prepared from the single component polymerization as set forth above. More particularly, there is a lack of para phenylene linkage in the polymer prepared from the single component this elimination of the para phenylene linkage is likely to reduce the coefficient of thermal expansion of the polymer which should enhance its use in many applications, especially in the electronics industry. The following is a more detailed explanation of the synthesis techniques.

(A) Preparation of 4-bromo-2-nitroaniline-4-bromoaniline (51.6 grams) and acetic anhydride (210 ml) were mixed under strong agitation. The temperature is raised to 65° C. in 10 minutes and slowly decreased to room temperature in one hour. An ice bath is used to maintain the temperature between 15°–20° C. and nitric acid (density 1.42, 30 ml) was added drop by drop in one hour. A yellow 4-bromo-2-nitroacetanilide was isolated by pouring the acetic anhydride solution into ice water followed by filtration. Hydrolysis of the acid acetanilide in aqueous hydrochloric acid (100 ml of concentrated HCL and 500 ml of water) at reflux temperatures for three hours yielded a 57% yield of 4-bromo-2-nitroaniline having the melting point of 109° C.

(B) Preparation of 2-nitro-4(phenylethynl)aniline 4-bromo-2-nitroaniline-(4.34 grams) was mixed with triphenylphosphine (0.2 grams) cuprous iodide (38 mg), palladium (II) acetate (12 mg), and triethylamine (20 ml) under mechanical stirring of 100° C. under nitrogen. Phenylacetylene (3.1 grams) was then added to the mixture and stirred at 100° C. for 3 hours. A white precipitate was observed after 10 minutes and the color of the mixture was darker. At the end of the reaction the color became yellow-brown. Triethylamine was stripped under reduced pressure and the reddish-brown product was washed with water to remove the triethylammonium salt. Drying and recrystallization from dichloromethane afforded pure 2-nitro-4-(phenylethynl)aniline as bright red crystals in a 84% yield, melting point of 158° C.

(C) Preparation of 4-amino-3-nitrobenzil-The 2-nitro-4-(phenylethynl)aniline (12 grams) were heated and dissolved in dichloromethane (250 ml). To this solution was added the following: Adogen 464 (1.0 grams), water (250 ml), sodium bicarbonate (3.2 grams) and potassium permangnate (21 grams). Adogen 464 is a tetralkylammonium type surfactant marketed by Ashland Chemical Company. The mixture was stirred vigorously at room temperature for 5 hours. A slight exothermicity indicated the progress of the oxidation. Sodium bisulfite (60 grams) and hydrochloric acid (10 ml) was added carefully to reduce excess permanaganate and manganese dioxide. The yellowish-brown product was isolated by dichloromethane extraction. Solvent removal afforded a brown solid. Pure 4-amino-3-nitorbenzil was obtained by recrystallization in acetonitrile in 71% yield, melting point of 189° C.

(D) Preparation and polymerization of 3,4-diaminobenzil-A reduction solution made from sodium dithionite (0.6 grams), sodium hydroxide (0.3 grams) and water (10 ml) was stirred under nitrogen. 4-amino-3-nitrobenzil (270 mg) dissolved in tetrahydrofuran (4 ml) was added to the reduction solution. The color changed from pale yellow to dark brown indicating the progress of the reduction. Reaction was completed in 20 minutes and extraction by dichloromethane removed the organic layer. Drying with magnesium sulfate and solvent removal yielded the brown 3,4-diaminobenzil. Upon dissolving the 3,4-diaminobenzil in m-cresol and heating to 180° C. for 3 hours, complete polymerization took place. The polymerization is indicated by bleaching of the reddish brown monomer to a yellowish brown polymer, the polymer may be isolated by precipitation with methanol as yellowish brown powder from the cresol solution.

(E) Reductive polymerization-In accordance with the reductive polymerization from 4-amino-3-nitrobenzil, a mixture of the amino nitrobenzil (270 mg), iron filings (0.24 grams), acetic acid (0.6 ml) and m-cresol (2 ml) was heated at 1250° C. in a seal tube under nitrogen for 4 hours. The mixture was poured into methanol and filtered. The polymer was further washed with water and methanol to remove iron salt and oligomer. Drying at 100° C. resulted in a pale-yellow polymer in 85% yield.

What is claimed is:

1. An article of manufacture comprising a polyquinoxaline polymer, said polymer having repetitive units being represented by the formula

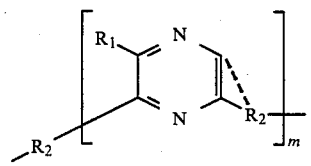

wherein
$R_1$ is selected from the group consisting of a cyclic and an aromatic moiety, and $R_2$ is part of a moiety selected from the group consisting of an aliphatic, a cyclic and an aromatic moiety,
and wherein said formula can be represented by a repetitive unit containing only one quinoxaline moiety.

2. The article recited in claim 1 wherein $R_1$ is an aromatic moiety and $R_2$ is part of an aromatic moiety.

3. The article recited in claim 1 wherein $R_1$ is a phenyl group and $R_2$ is part of an o-phenyldiamine.

4. The article of manufacture recited in claim 1 wherein said polymer is formed by auto condensation of a monomer being both a 1,2-diketone and a 1,2-primary diamine in the molecule.

5. The article of manufacture recited in claim 4 wherein said monomer is selected from the group consisting of the monomers with the structural formulas identified above by Roman numerals I through VII.

6. The article of manufacture recited in claim 1 wherein said polymer is represented by the formula

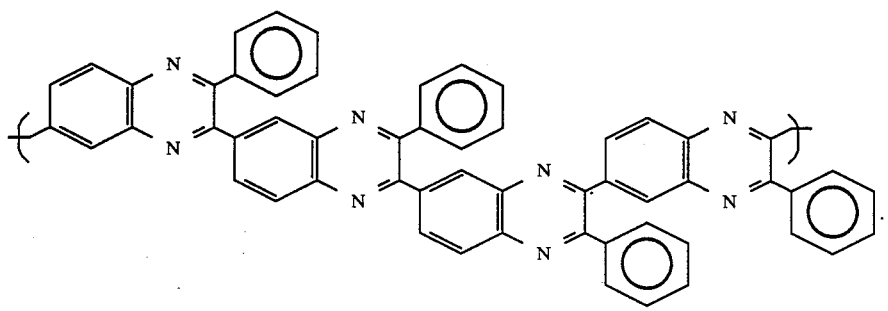

7. The article of manufacture recited in claim 1 wherein the polymer is in the form of a layer on a substrate.

8. The article of manufacture recited in claim 6 wherein said polymer is a film on a substrate.

9. An integrated circuit device comprising a semiconductor material having circuit elements defined therein said devce including a dielectric layer consisting essentially of a polyquinoxaline polymer as set forth in claim 1.

10. The integrated circuit device recited in claim 9 wherein said polymer has the structural formula

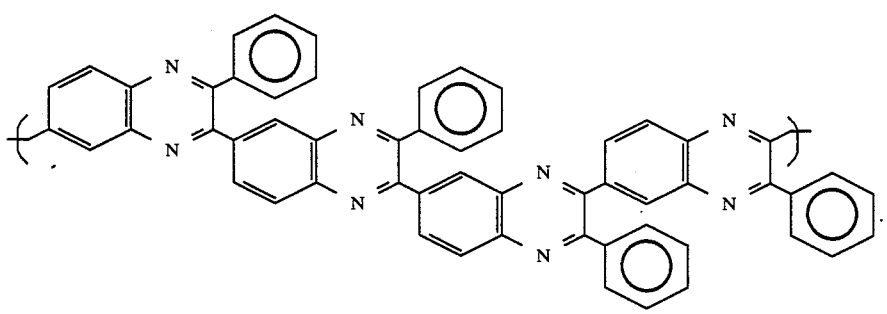

11. The article recited in claim 1 wherein said polymer is in the form of a film unsupported by a substrate.

12. A polyquinoxaline polymer represented by the formula

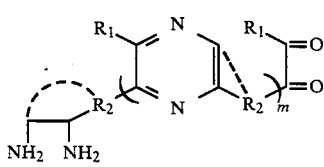

wherein $R_1$ is selected from the group consisting of

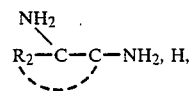

saturated partially saturated or unsaturated alkyl having from 1 to 30 carbon atoms and a saturated, partially saturated or unsaturated cyclic moiety, and a cyclic alkyl and

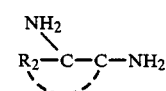

is selected from the group consisting of a saturated, partially saturated or unsaturated alkyl having from 1 to 30 carbon atoms and a saturated, partially saturated or unsaturated cyclic moiety and a cyclic alkyl, the dotted line representing linkage with the amine carbon when the moiety is cyclic.

13. A method of forming a polymer by auto condensation of a monomer having moieties thereon which are capable of reacting with each other to self polymerize the monomer comprising the step of reducing, in situ, a precursor of said monomer to form said monomer which monomer starts to polymerize as it is being formed, said monomr such as to form on polymerization repetitive units being represented by the formula

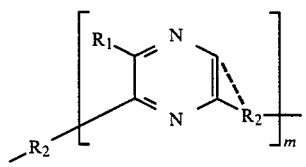

wherein $R_1$ is selected from the group consisting of a cyclic and an aromatic moiety, and $R_2$ is part of a moiety selected from the group consisting of an aliphatic, a cyclic and an aromatic moiety.

* * * * *